United States Patent [19]

Main

[11] 4,375,534

[45] Mar. 1, 1983

[54] METHOD OF MAKING A CONTACT LENS MATERIAL AND A LENS THEREFROM

[76] Inventor: Jim I. Main, 3044 Walton St., Apt. #7, Jacksonville, Fla. 32207

[21] Appl. No.: 177,901

[22] Filed: Aug. 14, 1980

[51] Int. Cl.³ ............................. C08F 4/34; C08F 2/02
[52] U.S. Cl. ........................................ 526/227; 203/6; 203/8; 203/29; 523/106; 526/317; 351/160 H
[58] Field of Search ................. 203/6, 8, 29; 528/490; 526/227

[56] References Cited

U.S. PATENT DOCUMENTS 3,709,928  1/1973  Murayama ............................. 203/8

Primary Examiner—C. A. Henderson
Attorney, Agent, or Firm—Fitch, Even, Tabin, Flannery & Welsh

[57] ABSTRACT

A new and improved contact lens is provided and is made by a process which uses a distillation step with an addition of a carbon decolorizing agent to the solution being distilled. The carbon decolorizing agent prevents curdling and removes impurities in the distillation step. The result is a contact lens with a very high water content and with good oxygen permeability characteristics.

8 Claims, No Drawings

METHOD OF MAKING A CONTACT LENS MATERIAL AND A LENS THEREFROM

This invention relates to a soft contact lens material and to a method of making soft contact lens material and lenses.

A large number of plastic materials have been proposed for use as contact lenses and for the so called "soft contact lens" which usually are of a plastic material which is hydrophilic. Most of the presently used soft contact lenses may be worn with less eye irritation than the harder plastic contact lenses but suffer some of the deficiencies of accumulating harmful compounds, failure to allow oxygen or gases to permeate the same, or favoring the growth of pathological organisms. Such lenses require sterilization and/or cleaning by heated vapors or baths and the necessity for frequent removal or placement in the eye. Additionally, the optical quality and light transmission characteristics of the lens material is most important. Strength and ability to retain and remember shape are also needed for a good lens material.

While a large number of compositions are available in the published literature and patent literature, a patent search on the present invention has revealed the following patents:
3,503,942
3,699,089
3,822,089
3,850,892
3,892,721
3,926,892
3,983,083
4,028,295

It is generally known that the tear flood flow across the surface of the contact lens adjacent the cornea of the eye reduces irritation to the user. Further, it is known that it is most desirable that the lens be capable of transmitting oxygen or other gases to or from the cornea so that an open molecular pore plastic contact lens is desirable. The present invention is particularly directed to the formation of a soft contact lens which has a high water content and which readily picks up water from the eye so as to maintain its water content despite prolonged periods of usage. For such a lens to be feasible, the lens must also be capable of being able to transmit oxygen and other gases to the cornea and to be washable or self cleaning by tears to prevent the excess buildup of harmful proteinaceous material in the lens. At cross purposes with the desirability of a very soft and wet contact lens is the need for sufficient strength and rigidity to allow the lens material to be cut or otherwise shaped into the final lens configuration. Typically, the lenses are desired to be cut on a lathe and to be formed with fine beveled edges. To allow such cutting, the lenses must have sufficient hardness so as to cut without becoming hot and yet not be so hard as to chip or shatter when being cut.

It is believed that a wide range of human beings that use contact lenses has sufficient tear production or capability to maintain a water content of a suitable plastic lens material in the range from about 66-73% water. An average range water content for such a lens material would probably be about 68-73%. In accordance with this invention, there has been produced a soft contact lens material which is compatible with receiving water from the eye and/or from steam from hot showers, etc., to retain sufficient moisture in the range of 66-73% and not dry out while worn for extended periods. It is believed that a typical person will experience a magnification change if his lens dries about 8 or 9% from that which it had originally when prescribed for him. While current commercially available lenses state they have a water content of 55%, it is believed that the lenses actually have only about a 50% water content. Thus, the present invention provides a high water content lens with good physical properties and good light transmitting and optical qualities.

A large majority of the presently made soft contact lenses are made with HEMA, that is Hydroxy-Ethyl-Methacrylate with a cross linking agent or a catalyst or solvent to form a pulverized cross linked material. While generally HEMA is available at very high purities with little or no contamination products therein, it has been discovered that even with the purchase of the higher quality material commercially available on the market that the HEMA can have its purity increased to provide a more eye compatible product for a contact lens material. Further, it has been learned through extensive trial and error that you can make a high water content, soft contact lens material, e.g. 73% water, with a good strength and sufficient hardness to be lathe cut. By careful selection of additive materials which are chosen for their various capabilities, there has been developed a contact lens which is soft and comfortable with a high water content and sufficient strength to be formed into a lens which can be worn for prolonged periods and, in some instances, continuously.

Accordingly, a general object of the present invention is to provide a new and improved contact lens as contrasted with the prior art.

Another object of the invention is to provide a new and improved method for formulating a soft contact lens.

DETAILED DESCRIPTION

In accordance with the present invention a HEMA type lens is formed with a high water content of about 73% in the preferred embodiment of the invention with a sufficiently large molecular pore structure for facilitating the transmission of oxygen to or from the eye and with a hydrophilic capability for maintaining its high water content and yet with sufficient strength to be formed into the lens material.

In accordance with an important aspect of the present invention, many of the impurities which are present in HEMA, and HPMA (Hydroxy-Propyl-Methacrylate) are removed by a distillation process. Other impurities which may be introduced with additive materials used to impart the lens material with desirable physical characteristics such as increased water retention and strength may also be removed by the distillation process. More specifically and in accordance with the preferred embodiment of the invention a soft contact lens material is formed from a mixture or solution of Hydroxy-Ethyl-Methacrylate and suitable additive materials for distilling with the addition of a carbon decolorizing agent serving to prevent curdling and jelling of the distilling mixture, and the mixture is distilled to leave a residue including the carbon decolorizing agent and some impurities. It has been found that, in accordance with the preferred embodiment of the invention, about 95% by weight of the mixture will be distilled and may be collected as a distillate with only 5% by weight remaining as a residue comprised substantially of the carbon decolorizing agent.

In the preferred embodiment of the invention to be described hereinafter as a specific example, the amount of HEMA in the lens material approaches 90% and a high HEMA content is needed to provide the desired optical qualities, strength and oxygen permeability. The preferred range is 80 to 90 percent by volume of HEMA. By adjustment of the HPMA, the amount of HEMA may be varied within a range of approximately 70% to 95% by volume. As the amount of HPMA is increased, there is a tendency for the lens to become more elastomeric, that is, stretchable, or rubbery, and to lose its strength and rigidity. As will be explained in greater detail, it is preferred to have only about 5.28% in volume of HPMA, but this amount may be increased or decreased with an inversely corresponding change in the percentage of HEMA. As used herein, the percentage by volume refers to amount of material relative to HEMA which is the base material.

Another constituent of the lens is Polyvinyl-Acetate which is added to increase the stability and the strength of the lens and is thought to aid in water retention of the polymerized material, prior to its hydration. As will be explained, the preferred Polyvinyl-Acetate is 0.75% in volume of the HEMA. While it is possible to increase the Polyvinyl-Acetate percentage by volume up to as much as 7%, or down to a minimum of approximately 0.25% by volume, the changes brought about by such variations in the Polyvinyl-Acetate result in considerable change in the stability, strength or water retention capabilities of the contact lens. As one approaches and goes below about 0.25% by volume of Polyvinyl-Acetate, the amount is so small that the physical strength properties attributed to the Polyvinyl-Acetate begin to disappear.

Another material used in the initial solution to be distilled is Polyvinyl Butyrol (BUTVAR), which is preferably 0.78% in volume in the preferred embodiment of the invention. BUTVAR aids in the water retention capability. While the percentage of BUTVAR may be varied, it is thought to be one of the more critical materials, whose volume when changed, is usually accompanied by change in one of the cross-linking agents SR-208 Cyclohexyl-Methacrylate or SR-211 Ethylene-Glycol-Methacrylate.

To make the lens soft, comfortable, and slick, there is added in the preferred embodiment of the invention about 0.72% by volume of Polycaprolactone. The Polycaprolactone is also thought to aid in water retention. If the percentage is raised from the preferred 0.72% in volume to about 3.5% in volume, the lens becomes too slick and will slide and not remain in place on the eyeball of the wearer. On the other hand, when the Polycaprolactone is reduced to a percentage of about 0.25% by volume or less, the lens is not sufficiently slick and comfortable feeling to the eye.

The above four described ingredients are all mixed together slowly to form a solution or mixture which is subjected to a distillation process. As explained above, the addition of the carbon decolorizing agent to the solution being distilled is most important; and surprisingly the preferred amount of carbon decolorizing agent used is relatively small being about 0.38% in volume weight in the preferred embodiment. Reduction of this percentage from about 0.38% to a 0.25% or less in volume appears to diminish the len's product. On the other hand, a substantial addition of the carbon decolorizing agent up to as much as 5% does not seem to adversely affect the ability of the carbon decolorizing agent to prevent curdling and to remove impurities, as described above. The carbon decolorizing agent remains behind as a residue and accounts for a major portion by weight of the residue in the distillation process.

After the distillation process, the cross-linking agents will be added and they are preferably SR-208 Cyclohexyl-Methacrylate and SR-211 Ethylene-Glycol-Methacrylate. It is preferred to use about 1.5% in volume based on the distilled solution of SR-208 Cyclohexyl-Methacrylate. The latter may range within about 0.5% to 5% by volume. As the volume of the SR-208 cross-linking agent is increased above 1.5%, the bond becomes very much stronger and prevents the HEMA and HPMA from expanding and taking up the water, particularly during a hydration process. On the other hand, when using the minimum volume percentage of this SR-208 cross-linking agent or less than the minimum, there results an insufficient bonding or cross-linking during Polymerization resulting in a product which, during hydration allows too great an expansion making the lens very weak with the loss of its durability and memory. Thus, a very weak lens, while having a considerable water content, will not be satisfactory because of its inability to retain its shape. On the other hand, use of too much of the SR-208 cross-linking agent results in too extensive cross-linking and closes down the pore size preventing gas or protein flow through the lens and sufficient water retention.

It is thought important to use a combination of the SR-208 and SR-211 cross-linking agents as they complement one another. Thus, it is possible to increase the SR-211 Ethylene-Glycol-Methacrylate cross-linking agent from its preferred volume of 0.50% of the solution having been distilled. When changing the proportion of SR-211 cross-linking agent, the other cross-linking agent, SR-208 Cyclohexyl-Methacrylate, is changed inversely and proportionately. It is thought that the cross-linking agent, such as the SR-211, be changed from its 0.50% to a maximum of about 5% and to a minimum of about 0.1%.

The changing of these particular cross-linking agents to other cross-linking agents is not thought to be advisable in that the optical quality is highly dependent upon the cross-linking agents, and the light transmission qualities of the lens are also determined by the cross-linking agents as well as the amount of expansion that the lens can achieve during hydration so that it becomes sufficiently permeable to prevent proteinaceous buildup which has plagued the commonly available sufficient contact lenses which have a relatively smaller pore size which traps the proteinaceous deposits. It is recognized that these and other cross-linking agents are commercially available for HEMA type materials, but after much trial and error, these agents have been found to be the best.

The starting of the polymerization process begins with the addition of Methacrylic-Acid to the distilled solution containing the cross-linking agents. In the preferred embodiment the Methacrylic-Acid is 4.88% in volume of the distilled solution. The amount of Methacrylic-Acid used is important. A change in the amount of this acid results in a significant change in the water content of the polymerized material before its hydration. It appears that the amount of this acid is also an important factor as to what extent the cross-linking chain is allowed to spread. Thus, the percentage of this acid is closely controlled to assure that the chain be spread sufficiently that the final material allows the flow of gases in and out of the contact lens and to allow the flow of proteinaceous material through the lens. The amount of Methacrylic-Acid may be increased to as much as about 8.5% by volume or decreased to about a minimum of 0.50% by volume.

The catalyst for the polymerization processes is a U.S.P. 245 Diperoxy-Ethel Hexoate, which is very critical to the hardness of the contact lens. A preferred 0.18% in volume of the distilled solution of this catalyst is used and results in the preferred embodiment of a plastic hardness of 88 on the hardness guage. If too much catalyst is used, the lens becomes too hard and brittle with the result that it will shatter or chip when being cut. On the other hand, if too little catalyst is used, the hardness is insufficient with the lathe cut being difficult because the lens material is too elastomeric and gets hot. That is, the material becomes gummy or rubbery rather than having the desired hardness for cutting.

It is thought that the critical percentage of the catalyst should not be varied by more than plus or minus 0.02% by volume from the 0.18% by volume.

As will be explained hereinafter, the preferred embodiment results in a lens which has good oxygen permeability and which does not leach out materials. Various leaching out tests have been applied to contact lenses. For instance, the preferred contact lens has been boiled for 24 hours in a solution which had a given PH. After the 24-hour boiling of the lens, the PH of the solution had not changed which is indicative of the fact that no material had leached out and changed the pH of the solution.

SPECIFIC EXAMPLE

All of the volumes of each of the components described herein are based on the amount of #2 Hydroxy-Ethyl-Methacrylate (HEMA) as the basic material. The preferred material is #2 Hydroxy-Ethel-Methacrylate made by Mitsubishi Gas Chemical Company and distributed by White Chemical Co. In a preferred embodiment of the invention, to the HEMA is added about 5.28% in volume of HPMA at a room temperature usually about 60°-70° F., while the HEMA is being constantly stirred or in constant motion. The preferred HPMA is 6-6159 Hydroxypropyl-Methacrylate sold by Rohm and Haas of Philadelphia, Pennsylvania. Thereafter, about 0.75% in volume of Polyvinyl-Acetate is mixed very slowly into the HEMA and HPMA solution which is being kept in motion. The preferred Polyvinyl-Acetate is Galva V-1.5 Polyvinyl-Acetate available from Monsanto Company from its Bircham Bend plant in Springfield, Massachusetts.

After the solution or mixture has been in motion for about fifteen minutes, heat is applied to slowly raise the temperature of the solution to about 185° F. (80° C.). At this last temperature further materials are added while stirring them slowly. These materials include 0.78% volume of Polyvinyl-Butyrol (BUTVAR). The preferred material is B-76 Polyvinyl-Butyrol sold by Monsanto Company's plant in Springfield, Massachusetts. Also, 0.75% volume weight of VIII Ethel Cellulose is added while the solution is in motion. The preferred material is #VIII Ethyl-Cellulose of Armour Industrial Chemical Company of Chicago, Ill.

To make the lens soft and slick with a comfortable finishing touch, there is added a liquid Polypropylene-Glycol material which is sold as P.C.P. 300 Polycaprolactone by Union Carbide Corporation of Chicago, Ill. With the addition of the BUTVAR, Ethel-Cellulose and Polypropylene-Glycol in the small amounts indicated above to the solution mixture of HEMA and HPMA, the solution is kept in motion and stirred for approximately one hour to achieve a good mixing of the components of the solution at the temperature of about 185° F.

At this point in time, the solution is almost ready for distillation and for receiving the Carbon-Decolorizing agent which is about 0.38% volume of Carbon-Decolorizing-Neutral Norit which is available from Algemeene Norit Maatschappij, Amsterdam, Netherlands. As explained above, this keeps the solution from curdling or jelling during the distillation procedure and this also aids in removing impurities, particularly from the HEMA and HPMA, even though these materials are of the highest commercial grade presently used for making contact lenses.

The distillation procedure involves the use of equipment suitable for a rotary flash distilling batch method. The oil bath of the rotary flash distilling unit is preheated to a minimum of 70° C. and not greater than a maximum of 90° C. and the vacuum of this unit must yield about 30 inches of mercury or lower with the greatest vacuum available being used. Also, for the distilling unit to operate, the cold water must be connected to the condenser. With the rotary flash unit in operation, the distillation process is begun and the distillation processes is carried out at about 86° C. It has been found that approximately 95% by weight of the material is recovered as distillate with only about 5% of the material remaining as a residue. The residue has been examined and has been found to consist principally of the Carbon-Decolorizing agent.

The product of distillation is removed from the distillation unit while at room temperature and a filtration thereof is then accomplished. The filtered material is kept in motion and the remaining components are added to the filtrated solution which is being kept in motion. To the volume of the distilled and filtrated solution, there is added about 1.5% by volume of the first cross-linking agent, SR-208 Cyclohexyl-Methacrylate (Distilled Grade) and about 0.5% in volume of the second cross-linking agent SR-211 Ethylene-Glycol-Methacrylate (Distilled Grade) both of these cross-linking materials are available from Esschem Company Division of Sartamer Industries, Inc. of Essington, Pennsylvania. To start the reaction which ends in the product to be polymerized, there is added about 4.8% in volume of #5703 Methacrylic-Acid of highest purity M.P. 13°–15° C. CH$_2$: CH COOCH$_3$ F.W. 86.09 from Fisher Scientific Products of Chicago, Illinois. Then is added 0.18% in volume of the catalyst CAT. #U.S.P. 245 Diperoxy-Ethyl Hexoate, 2-5 Dimethylhexane; 2.5 Diperoxy; 2 Ethyl Hexoate available from Witco Chemical, U.S. Peroxygen Division of Richmond, Calif. The volumes of materials added to the distillated and filtered solution are based on the latter as the base material.

All of these materials, having been added to the filtered and distilled solution, preferably in the order and at the volumes at the temperatures described herein, are then kept in constant motion for approximately 10 hours to achieve a thorough mixing of all these materials.

After 10 hours, the material is ready for the polymerization process.

After this 10 hours, the material is placed in small molds for Polymerizing into lens blanks. The Polymerization process involves setting the oven at 86° C. with the material being placed in the oven for about 25 or 30 minutes. The polymerization should be in an air-circulating oven, as the acid evaporates along with some other materials. A microwave oven without air circulation has been tried, but was found unsatisfactory.

After the formation of the polymerized material into blanks which are allowed to cool to room temperature, the material is trimmed to form blanks which are precisely in this instance 0.5 inches in diameter and 500 millimeters in thickness. The trimming of the blanks to the desired diameter requires a sharp tool and has to be very accurate.

In order for the lens to be cut, it should be of the proper physical properties most important of which is its hardness. The base curve lathe must be adjusted to perform the cutting of the base curve without putting a high or undue amount of stress in the plastic material. The base curve selected should then be cut, and it needs to be rounded off to a fine finish and the base curve needs to be polished to a high optical quality and to precise curvature. If the lens blank is too hard, it will chip, or shatter, and on the other hand, if too soft, it will heat up and not cut well.

The lens blank is then ready for removal of the outside excessive material. For this purpose the lens is mounted on a solid block, and the lathe is adjusted precisely with the lens blank being cut to produce to the desired thickness. The outside edge is then rounded off to define with the inner cut an edge of 0.02 mm. radius and is provided with a fine finish. The outside surface is polished to a highly optical quality and the desired power. After these steps, the lens is ready to be dismounted from the block and is ready for the hydration process.

The preferred polish compound used is made of the following materials:

Polish Compound Formula.
1000 ml WD-40
1400 ml DRY X-PAL
600 ml MELTED ALL SEASON WAX (30 sticks)
25 drops MENTYL SALICYLATE.

As is known, after the lens blanks have been cut, they are then hydrated in a solution having a P.H. 7.20. The solution is buffered soda bicarbonate which is heated to about 90° C., or just below the boiling temperature. The heated hydrating solution is kept in constant circulation in an enclosed vessel so that vapors cannot escape and lower the pH of the solution. The lenses are thought to hydrate in 2 hours, but are kept in the heated hydrating solution for 8 hours. The solution and lens are allowed to cool to room temperature before the lens are removed from the bath.

The hydrated lens are then checked and will be found to have expanded 52% and to have a 73% water content. That is, the lens will expand 52% in diameter after hydration.

The following are given by way of specifications for lens made by the above-described specific example.

SUBJECT-Hydrophilic lens convertion chart for 20% linear expansion

| Content | |
|---|---|
| Wet reading Plano | Dry reading Plano |
| −0.50 | −0.87 |
| −1.00 | −1.62 |
| −1.50 | −2.12 |
| −2.00 | −2.87 |
| −2.50 | −3.50 |
| −3.00 | −4.25 |
| −3.50 | −4.87 |
| −4.00 | −5.62 |
| −4.50 | −6.37 |
| −5.00 | −7.12 |
| −5.50 | −7.87 |
| −6.00 | −8.50 |
| −6.50 | −9.25 |
| −7.00 | −10.00 |
| −7.50 | −10.62 |
| −8.00 | −11.37 |
| −8.50 | −12.12 |
| −9.00 | −12.87 |
| −9.50 | −13.02 |
| −10.00 | −14.37 |
| −10.50 | −15.25 |
| −11.00 | −16.00 |
| −11.50 | −16.62 |
| −12.00 | −17.37 |
| −12.50 | −18.12 |
| −13.00 | −18.87 |
| −13.50 | −19.75 |
| −14.00 | −20.50 |
| −14.50 | −21.25 |
| −15.00 | −22.00 |
| −15.50 | −22.62 |

SEMI-PERMANENT SOFT CONTACT LENSES

| WET | DRY |
|---|---|
| A. CONTENT Minus Power | |
| −1.00 | −2.12 |
| −1.50 | −3.12 |
| −2.00 | −4.37 |
| −2.50 | −5.25 |
| −3.00 | −6.25 |
| −3.50 | −7.37 |
| −4.00 | −8.37 |
| −4.50 | −9.50 |
| −5.00 | −10.50 |
| −5.50 | −11.62 |
| −6.00 | −12.50 |
| −6.50 | −13.62 |
| −7.00 | −14.75 |
| −7.50 | −13.75 |
| −8.00 | −16.62 |
| −8.50 | −17.75 |
| −9.00 | −19.00 |
| −9.50 | −20.00 |
| −10.00 | −21.00 |
| B. CONTENT DIAMETER | |
| 13.0 | 8.6 |
| 13.5 | 8.9 |
| 14.0 | 9.3 |
| 14.5 | 9.6 |
| 15.0 | 9.9 |
| 15.5 | 10.2 |
| 16.0 | 10.6 |
| C. CONTENT BASE CURVE | |
| 8.20 | 6.30 |
| 8.50 | 6.60 |
| 8.80 | 6.90 |
| 9.10 | 7.20 |
| 9.40 | 7.50 |

From the foregoing it will be seen that there has been provided an extremely good contact lens blank and, after cutting and hydration, a contact lens having an expansion of 52% and a water content of 73%. Naturally, these precise figures may be varied and still result in a method and product fall which fall within the invention as defined in the appended claims. While the materials used as described herein are known, the combinations thereof and the percentages of each used have been arrived at after exhaustive trial and error experimentation to produce a lens which may be worn for extended periods of time. Indeed, the lens of present invention may be considered a semi-permanent wear lens that may be worn for months or longer because of the properties thereof. The lenses are capable of being mass produced at a competitive price particularly if used as a semi-permanent lens or a permanent lens for people who have had cataract operations.

While a preferred embodiment has been shown and described, it will be understood that there is no intent to limit the invention by such disclosure but, rather, it is intended to cover all modifications and alternate constructions falling within the spirit and scope of the invention as defined in the appended claims.

What is claimed is:

1. In a method of manufacturing a soft contact lens material from hydroxy-ethyl-methacrylate and a cross linking agent, the improvement comprising adding a carbon decolorizing agent to said hydroxy-ethyl-methacrylate to prevent it from curdling and gelling during distilling, and distilling the hydroxy-ethyl-methacrylate to leave a residue including the carbon decolorizing agent and to provide a hydroxy-ethyl-methacrylate distillate adapted for subsequent polymerization.

2. A method in accordance with claim 1 in which the step of distilling results in about 95% by weight of the hydroxy-ethyl-methacrylate being distilled being passed over and being collected as a distillate and with about 5% by weight remaining as said residue, said residue comprising mostly the carbon decolorizing agent.

3. A method in accordance with claim 1 including the step of continually stirring the hydroxy-ethyl-methacrylate during all steps through the distilling stage.

4. A method in accordance with claim 1 further comprising the steps of mixing about 70% to 95% by volume of hydroxy-ethyl-methacrylate with less than 10% by volume of hydroxy-propyl-methacrylate and less than about 1% by volume of each of polyvinyl-acetate, polyvinyl-butyrol, ethyl-cellulose, and polypropylene-glycol to form a hydroxy-ethyl-methacrylate-based solution and distilling said solution to form a hydroxy-ethyl-methacrylate-based distillate adapted for subsequent polymerization.

5. A method of manufacture of a contact lens blank having a water content of about 50% prior to hydration comprising the steps of: mixing and forming a solution having as a major component hydroxy-ethyl-methacrylate and having a substantially lesser amount of hydroxypropyl-methacrylate and having minor amounts of polyvinyl-acetate, polyvinyl-butyrol, ethyl-cellulose, and polypropylene-glycol; distilling the solution while it is heated and while the solution is kept moving to create a distillate; filtering the distillate; adding to the distillate minor amounts of cyclohexyl-methacrylate, ethylene-glycol-methacrylate, methacrylic-acid, and deperoxy-ethyl-hexoate and mixing the same to form a material for polymerizing and, polymerizing the last-formed material to form a lens blank.

6. A method in accordance with claim 5 including the further steps of cutting the lens blank to shape and hydrating the cut lenses in a buffered hydration solution to cause expansion of the lenses and hydration thereof.

7. A method of forming a contact lens blank comprising the steps of mixing a mixture for distillation having by volume a majority amount of hydroxy-ethyl-methacrylate, adding about 5.27% in volume of hydroxypropyl-methacrylate, adding about 0.75% in volume of polyvinyl-acetate, adding about 0.78% in volume of polyvinyl-butyrol, adding about 75% in volume of ethyl-cellulose, adding about 0.72% in volume of polypropylene-glycol, adding about 0.38% in volume of carbon-decolorizing-neutral-norit; while mixing maintaining in motion all of the above-mentioned materials, distilling the materials to leave behind a residue including the carbon decolorizing agent; collecting the distillate solution and adding thereto about 1.5% in volume of cyclohexyl-methacrylate, and about 0.50% in volume of ethylene-glycol-methacrylate, and about 4.88% in volume methacrylic-acid, and adding about 0.18% in volume of deperoxy-ethyl hexoate and then mixing these materials, and polymerizing the last-mentioned material to form a lens material.

8. A method of forming a hydrated soft contact lens from a blank formed in accordance with claim 7 comprising the steps of forming a hydrated lens by cutting the polymerized material into a lens and hydrating the lens in a buffered solution of about 7.2 pH for at least two hours to provide a lens having a water content of, at least, 66%.

* * * * *